Figure 1:
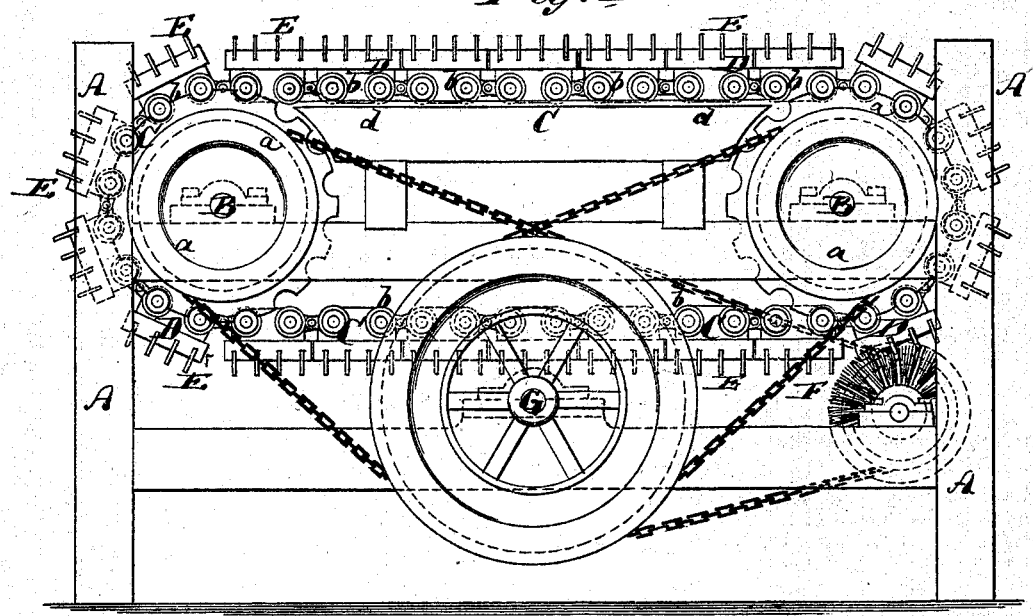
Figure 3:
Figure 2:
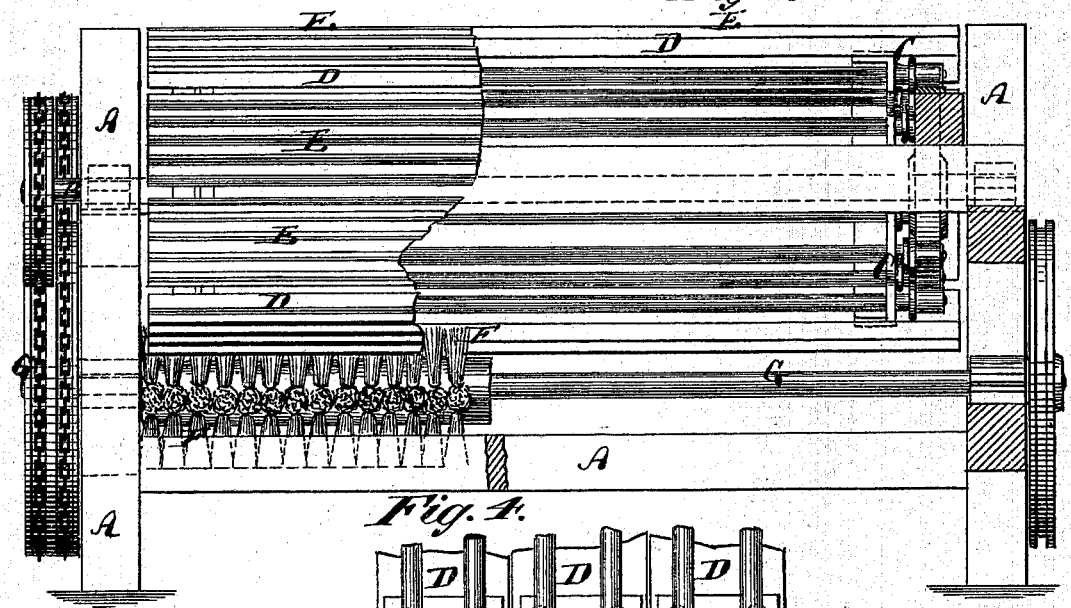
Figure 4:
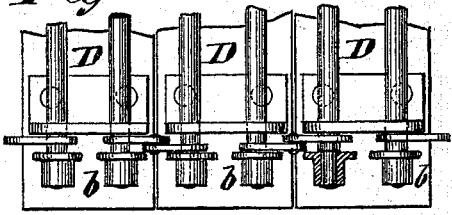

R. C. TOMPKINS.
Animal Carcass Scraping Machines.

No. 144,579.    Patented Nov. 11, 1873.

Witnesses
John Becker
Fred Haynes

R. C. Tompkins
by his attorneys
Brown & Allen

UNITED STATES PATENT OFFICE.

RHINELANDER C. TOMPKINS, OF NEW YORK, N. Y.

IMPROVEMENT IN ANIMAL-CARCASS-SCRAPING MACHINES.

Specification forming part of Letters Patent No. 144,579, dated November 11, 1873; application filed August 4, 1873.

*To all whom it may concern:*

Be it known that I, RHINELANDER C. TOMPKINS, of the city, county, and State of New York, have invented an Improved Scraping-Machine, of which the following is a specification:

This invention relates to a new machine for dressing hogs and other animals after the same have been slaughtered, and more particularly for removing the bristles from their skins, and it may also be used for removing scales from fishes. The invention consists in the use of a rotary endless chain, containing a series of projecting scraping tools or plates.

In the accompanying drawing, the letter A represents the frame of my improved scraping-machine. The same supports near its ends two transverse shafts, B B, on which polygonal or notched disks $a\ a$ are mounted for receiving and holding an endless chain, C. The endless chain or apron is composed of a series of transverse slats, D D, connected by appropriate links, said slats holding at their outer faces each a series of projecting blades or scraping-tools, E E. The outer faces of these scraping-tools E are, by preference, made square, or nearly so, in order not to cut and injure the skins of the animals, but merely to cleanse and dress them. The chain has at its sides a series of friction-rollers, $b\ b$, that rest between the disks $a\ a$ on fixed rails $d$ that are provided on the frame A. Directly after these rollers have left the rails they enter the notches of one of the drums or disks $a$. By means of the rails $d$ the upper part of the chain is properly supported, so that the hog or other animal to be dressed, and which is placed upon the top of the apron, will not depress the apron beneath it, but will be firmly and properly held thereby.

The operation of the machine is easily understood. The animal to be scraped or dressed is held by its hind legs and placed on the apron, and then manipulated so that all or nearly all parts of its body will be subjected to the action of the scraping-tools E as the same pass under and come in contact with it. A circular brush, F, may be hung in the frame A beneath or near one end of the apron C, with the object of cleaning the tools E after the same have passed the body of the animal, and keeping them trim and in good condition for continuous use. The shaft B, and also the brush F, if used, receive rotary motion by chains or belts from a driving-shaft, G, hung in the frame A, or by other equivalent means.

I claim as my invention—

The scraping-machine consisting of the endless chain of scraping-tools E E, all as herein shown and described, and for the purpose specified.

RHINELANDER C. TOMPKINS.

Witnesses:
HENRY T. BROWN,
FRED. HAYNES.